(12) United States Patent
Whitten et al.

(10) Patent No.: US 12,724,422 B2
(45) **Date of Patent: *Sep. 1, 2026**

(54) PERCEPTION-BASED NAVIGATION FOR MOBILE MACHINES

(71) Applicant: Caterpillar Inc., Peoria, IL (US)

(72) Inventors: Andrew T. Whitten, Dunlap, IL (US); Adam Jacobson, Chermside West (AU); Michael D. Braunstein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,498

(22) Filed: May 30, 2024

(65) Prior Publication Data

US 2025/0370456 A1 Dec. 4, 2025

(51) Int. Cl.

| | |
|---|---|
| ***G05D 1/246*** | (2024.01) |
| ***G05D 1/244*** | (2024.01) |
| *G05D 105/05* | (2024.01) |
| *G05D 105/80* | (2024.01) |
| *G05D 107/70* | (2024.01) |

(52) U.S. Cl.

CPC ............. *G05D 1/246* (2024.01); *G05D 1/244* (2024.01); *G05D 2105/05* (2024.01); *G05D 2105/87* (2024.01); *G05D 2107/70* (2024.01)

(58) Field of Classification Search

CPC .... G05D 1/246; G05D 1/244; G05D 2105/05; G05D 2105/87; G05D 2107/70

See application file for complete search history.

(56) References Cited

U.S. PATENT DOCUMENTS

| | | | |
|---|---|---|---|
| 6,292,715 B1 | 9/2001 | Rongo | |
| 8,868,302 B2 | 10/2014 | Everett et al. | |
| 8,924,067 B2 | 12/2014 | Halder et al. | |
| 9,097,520 B2 | 8/2015 | Stratton et al. | |
| 9,142,063 B2 * | 9/2015 | Chen ...................... | G05D 1/024 |
| 9,182,760 B2 | 11/2015 | Braunstein et al. | |
| 10,222,215 B2 | 3/2019 | Holz | |

(Continued)

FOREIGN PATENT DOCUMENTS

| | | |
|---|---|---|
| CN | 115328171 B | 2/2023 |
| CN | 115683086 A * | 2/2023 |

(Continued)

OTHER PUBLICATIONS

U.S. Appl. No. 18/678,421, filed May 30, 2024.
U.S. Appl. No. 18/678,448, filed May 30, 2024.
U.S. Appl. No. 18/678,472, filed May 30, 2024.

*Primary Examiner* — Khoi H Tran

(57) ABSTRACT

A map generation application and method generates a computer-readable worksite map for managing navigation and travel for a plurality of mobile machines equipped with perception-based localization and navigation systems at a worksite. Survey data and development data associated with the worksite are obtained and used to prepare an unmarked worksite development map including one or more travel/activity areas. Marker positioning factors are obtained and are associated with the one or more travel/activity areas. The application determines assigned marker positions based on the marker positioning factors for the placement of physical markers about the worksite.

20 Claims, 5 Drawing Sheets

(56) References Cited

U.S. PATENT DOCUMENTS 10,788,603 B2 9/2020 Cortelyou et al.
11,169,534 B2 11/2021 Micks et al.
11,378,964 B2 7/2022 Wei
11,520,332 B1 12/2022 Zamiska et al.
11,531,113 B1 12/2022 Bristow
11,549,817 B2 1/2023 Ondruska et al.
11,555,705 B2 1/2023 Lin Sörstedt et al.
2009/0099707 A1 4/2009 Greiner
2012/0173185 A1 7/2012 Taylor et al.
2013/0311153 A1 11/2013 Moughler et al.
2014/0184643 A1 7/2014 Friend
2016/0342915 A1 11/2016 Humphrey
2020/0117201 A1 4/2020 Oetken et al.
2020/0241561 A1 7/2020 Hendricks
2021/0003683 A1 1/2021 Chen et al.
2021/0011122 A1 1/2021 Tanaka et al.
2021/0018927 A1* 1/2021 Ackerman ........... G05D 1/0268
2021/0182758 A1 6/2021 Deenathayalan et al.
2021/0230842 A1 7/2021 Vorobiev et al.
2022/0091271 A1 3/2022 Iwase et al.
2022/0111515 A1 4/2022 He et al.
2022/0180131 A1 6/2022 Oblak et al.
2022/0252405 A1 8/2022 Imazu
2023/0004161 A1 1/2023 McClelland
2023/0297900 A1* 9/2023 Bonnington ..... G06Q 10/06315 705/7.26
2024/0025040 A1* 1/2024 Vangal Ramamurthy .................. G09B 29/006
2025/0369772 A1* 12/2025 Braunstein ......... G01C 21/3826

FOREIGN PATENT DOCUMENTS

DE 102020003930 A1 3/2021
EP 2983955 B1 6/2019
EP 3670757 A1 * 6/2020 ............. G01C 15/06
EP 3926304 A1 12/2021

* cited by examiner

PERCEPTION-BASED NAVIGATION FOR MOBILE MACHINES

TECHNICAL FIELD

This patent disclosure relates generally to the management and coordination of mobile machines about a worksite and, more particularly, to a system and method for assisting in the perception-based navigation of a plurality of mobile machines at the worksite.

BACKGROUND

The development of large-scale worksites, such as in mining or construction, involves the communication and coordination of information about the worksite between the personnel and mobile machines that are performing activities or tasks at the worksite. A variety of different mobile machines need to move to different locations about the worksite to conduct different assigned tasks. For example, to haul material, haul machines such as haul trucks used in mining are off road, large scale mobile machines specifically designed for transporting significant quantities of material, e.g., several tons, about the worksite. Other examples of mobile machines include dozers, loaders, excavators, graders, scrapers, etc.

To coordinate the development of the worksite, a central administrative or planning unit is often established. The central unit is responsible for monitoring and managing worksite activities and assigning and allocating resources to complete worksite tasks efficiently. As part of this activity, the central unit may be responsible for establishing the locations of travel routes and operation sites where the plurality of mobile machines travel and operate. The locations of the travel routes and operation sites may be maintained in the form of a computer generated electronic worksite map, which may be dynamic and updated as the worksite develops.

Various systems and methodologies have been developed for use in connection with the electronic worksite map to assist in localization and navigation of the personnel and mobile machines operating within the physical worksite. One common system involves the use of flags and markers located in the physical worksite to designate particular locations and/or worksite activities maintained by the electronic worksite map. The markers may be artificial structures placed about the worksite at appropriate locations, or may be associated with geographic features such as berms, rocks, tree lines, etc. The physical markers can correspond to assigned marker positions in the electronic worksite map that are shown on a visual display. An operator onboard a conventional mobile machine can visually perceive the designated markers and, by referencing the assigned marker positions in the electronic worksite map, can determine their position in and movements through the worksite.

More recently, many mobile machines are being configured for autonomous operation in which human interaction is reduced. To enable an autonomous mobile machine to navigate and travel about the worksite, for example, by recognizing the flags and markers as well as other objects and landmarks, the mobile machines may be configured with a perception based locating and navigation system that utilizes machine vision and object detection technologies. In some applications, the perception based systems may utilize electronic maps and worksite markers to facilitate localization and navigation.

U.S. Pat. No. 9,142,063 describes an autonomous mobile machine that is equipped with perception sensors for determining geographic positions of objects about a worksite such as a mine. As the perception sensors detect various objects in the physical worksite, an electronic map can be generated or updated with the locations of the detected objects. The electronic object map can be generated and maintained locally onboard the mobile machine, or may be a preloaded map with a priori information about the physical worksite obtained from previously gathered survey data maintained and processed by an off-board computer system and remote database. The mobile machine utilizes the electronic object map and the perception sensors for positioning and navigation about the physical worksite.

The present disclosure is directed to similar improvements in the use of perception-based navigation technologies and electronically generated object maps to coordinate travel and operation of mobile machines at a worksite that in some instances may be autonomously controlled.

SUMMARY

In an aspect, the disclosure describes a worksite server including a map developer routine/module for preparing an unmarked worksite map and a marker assignment routine/module for assigning assigned marker positions. The developer routine/module programmed can receive survey data about a physical worksite to prepare the unmarked worksite map. The marker assignment routine/module can include an analytic engine and a simulator. The analytic engine is programmed to assign at least one assigned marker position to the unmarked worksite map and the simulator is programmed to simulate the effectiveness of the at least one assigned marker.

In a related aspect, the disclosure describes a computer-implemented method of developing a computer-readable worksite map of a physical worksite. The method involves generating a worksite map including a plurality of assigned marker positions based in part on the one or more marker positioning factors. The method then simulates an assigned marker position from among the plurality of marker positions to assess effectiveness of a perception-based localization and navigation system to respond to the assigned marker position. Based on the simulation, the method may adjust the assigned marker position.

In another aspect, the disclosure describes a computer-implemented method for preparing a computer-readable worksite map for use by a mobile machine equipped with a perception-based localization and navigation system. The method retrieves the worksite map that includes one or more assigned marker positions and obtains marker perception data from a perception-based localization and navigation system. The method then analyzes the perception data for perceptibility effectiveness with respect to a physical marker in the physical worksites and can make adjustments to the assigned marker position in the worksite map to improve perceptibility effectiveness of the physical marker.

DETAILED DESCRIPTION

Figure 1:
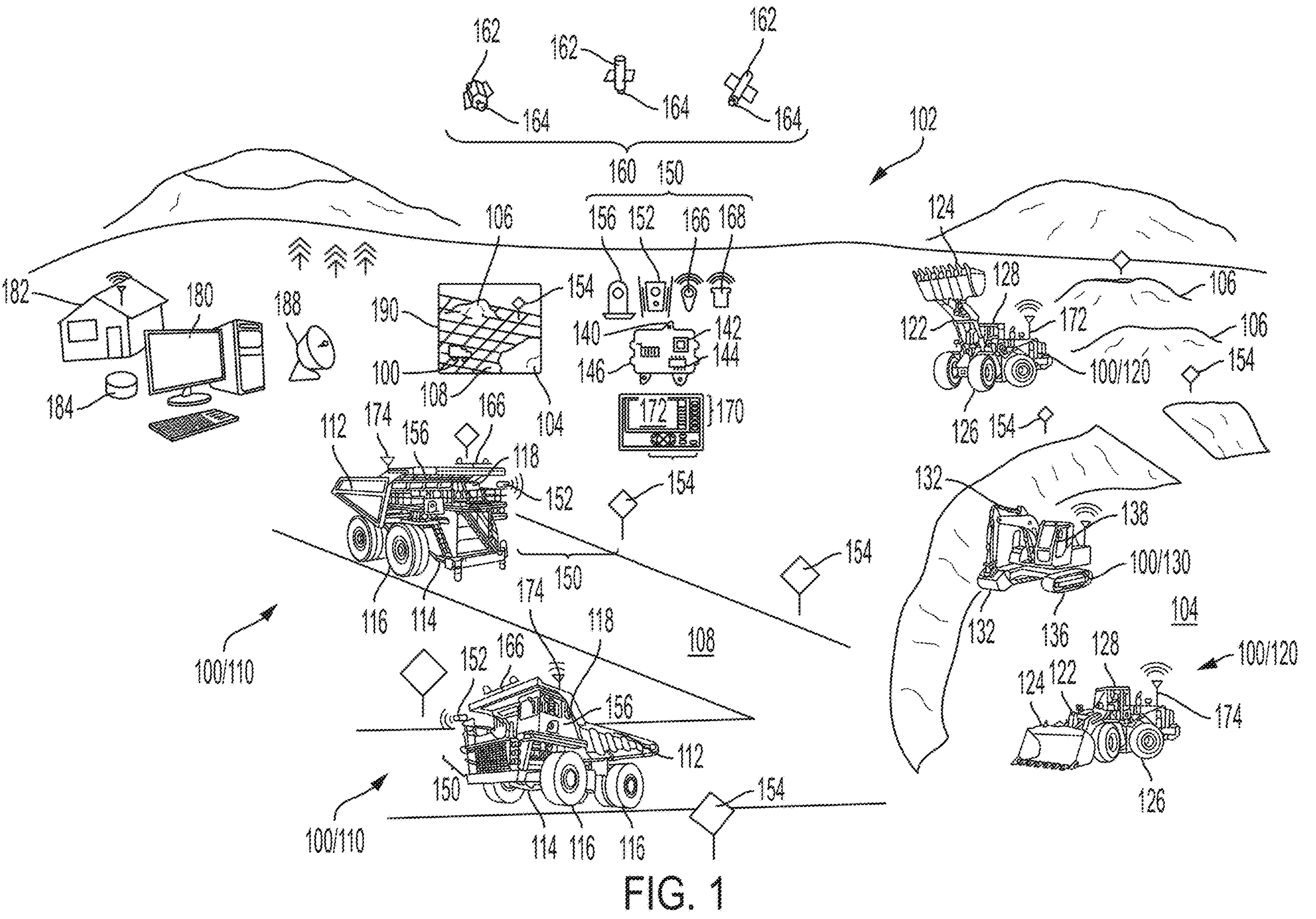
FIG. 1 is a schematic illustration of a worksite such as a mine or quarry having a plurality of mobile machines cooperatively operating with a perception-based locating and navigation system implemented in accordance with the disclosure.

Now referring to the drawings, wherein whenever possible like reference numbers will refer to like elements, there is illustrated in FIG. 1 a plurality of mobile machines 100 operating at worksite 102 such as a mine or a quarry for extraction, processing, and distribution of mined material such as coal, ore, minerals, construction aggregate, and the like. However, aspects of the disclosure may be applicable to other types of worksites 102 where coordinated activities are simultaneously occurring, including large-scale construction sites, agricultural sites, and the like. The worksite 102 is characterized by its terrain or geographic topology by the presence of structures and equipment to develop the worksite, by activities and/or operations occurring at the worksite, which may be referred to as worksite features. A “worksite feature” refers to a characteristic or attribute of the worksite.

For example, the worksite features may be associated with the various different operations, tasks, and processes conducted at different locations, or operation sites, in the worksite 102. For example, to obtain the raw materials, the worksite 102 may be associated with one or more excavation sites 104 or mines, which may be above ground or below ground and which are the physical locations where the raw materials are excavated from the ground. The excavation site 104 may be an open-pit or open cast surface mine in which the overburden (vegetation, dirt, and the like) is stripped away and removed to access the raw materials underneath. The raw materials may be separated from the ground by drilling, hammering, or blasting operations and removed from the excavation site 104. In other examples, the excavation site 104 may be a subsurface or underground mine in which tunnels are dug into the earth to access the raw materials.

The separated materials may be temporally deposited in one or more material piles 106 located at different places about the worksite 102. The material piles 106 are operation sites associated with loading and dumping operations that may be performed by the mobile machines 100. Other examples of operations that may occur at different locations about the worksite 102 can include construction locations, clearing or leveling operations, harvesting, etc. In addition to different operations, examples of other worksite features that may characterize the worksite 102 can include buildings and structures, natural stationary objects such as hills, mountains, berms, ravines, wooded areas, and any features that are present and characterize the terrain and geographic topography of the worksite 102.

For example, a common feature at mines and similar worksites 102 is the presence of travel routes 108 or haul paths to enable the mobile machines 100 to travel between the various operations such as the excavation sites 104, material piles 106, and material processing stations such as, for example, crushers. Because of the ongoing activities and unfinished nature of the worksite 102, the travel routes 108 are typically unpaved and comprise paths of compacted earthen materials to support movement of the mobile machines 100, although some portions may be paved and comprise structures like bridges, designated lanes, and the like. The travel routes 108 can be designed to efficiently and expeditiously direct the mobile machines 100 around the worksite 102 and avoid obstacles, hazards, and other critical areas.

Among the plurality of mobile machines 100, haul trucks or haul machines 110 are particularly suited for the transportation of material about the worksite 102. Off-road hauling machines 110 can include a hauling body 112, which may be a dump body, into which material may be loaded. The hauling body 112 can be hinged to a machine frame 114 and can be articulated to dump material at a designated location. The machine frame 114 can be supported on a plurality of wheels 116 to propel and move about the worksite 102. To power propulsion by rotation of the wheels 116, the hauling machine 110 can include a power source or power plant such as an internal combustion engine for the combustion of hydrocarbon-based fuels to convert the latent chemical energy therein to motive power; although other examples of suitable power sources include electric motors associated with rechargeable batteries or fuel cells.

To accommodate an onboard operator, the hauling machine 110 can include an onboard operator station 118, which may be an enclosed space situated on the machine frame 114 at a location to provide visibility about the worksite 102. Located in the operator station 118 can be various machine controls and operator interfaces, such as steering, speed and direction controls, through which the operator controls operation of the haul machine 110. The operator interface can be embodied as levers, joysticks, steering wheels, pedals, dials, buttons, switches, and the like. Operator interfaces may also include visual displays and readouts to convey information with the operator. In accordance with the disclosure and described below, the haul machines 110 may also be configured for autonomous or semi-autonomous operation, or may be remotely controlled by an offboard operator using a remote control transmitter.

To sustain the rugged operating conditions about the worksite 102, the hauling machine 110 may be designed for off-road operation and may be characterized by its ability to travel over unpaved or unfinished, often rugged, surfaces or surfaces that are often configured for heavy duty or hazardous operating conditions. Further, the off-road hauling machine 110 can be configured to accommodate the significant material quantities involved in a mining operation with the volumetric capacity of the haul body 112 sized to accommodate several tons. Another example of hauling machines 110 that may operate at the worksite 102 can be on-road trucks, characterized by their ability for long-distance travel on paved surfaces and roadways.

To load material to the hauling machines 110, one or more loading machines 120 in the embodiment of a bucket loader, underground haulers, load-dump machines, etc., can also operate about the worksite 102. The loading machine 120 can include a lifting implement 122 with an attached bucket 124 shaped as an opened trough to receive material. The lifting implement 122 can be raised and lowered to move material from the material piles 106 and deliver it the hauling machine 110. The loading machine 120 can be supported on a plurality of wheels 126 for movement between the material piles 106 and haul machines 110 and may be powered by an internal combustion engine or an electrical power source. To accommodate an onboard operator, the loading machine 120 can also include an operator station 128 in which machine controls and operator interfaces are located, although in some examples, operational activities of the loading machine 120 can be automated or remotely controlled.

To dislodge and separate material from the worksite 102, another example of a mobile machine 100 can be an excavator 130 that includes a bucket 132 disposed at the end of another mechanical lift implement 134 that can articulate in various directions to maneuver the bucket. The lift implement 134 can be a mechanical linkage including a boom, a dipper, and a stick pivotally connected to each other. In addition to digging and excavating the material, excavators 130 can be used for loading haul machines 110, demolishing structures or obstacles, and the like. Typically, the excavator 130 can be operatively supported on a plurality of ground-engaging traction devices like continuous tracks 136 through a rotatable platform or undercarriage that rotates to swing the bucket 132 and lift implement 134 about the vertical axis of the excavator. To accommodate an onboard operator, the excavator 130 can also include an operator station 138 that is rotatably supported on the continuous tracks 136, although in some examples, operational activities of the loading machine 120 can be automated or remotely controlled. Other types of excavation machines can include rope shovels, hydraulic mining shovels, etc.

In addition to the foregoing examples, other types of mobile machines 100 may conduct material handling and transportation operations at the different operation sites about the worksite 102. For example, dozers may include a forward mounted blade elevated to push material over the surface of the worksite 102 and tankers/water trucks can be used for carrying water or fuel about the worksite. Water trucks may be used to deposit water over the haul routes to reduce dust at the worksite 102. As another example of a machine may be a mobile drill or surface drill used in blasting operations. As used herein, the term "machine" refers to any type of machine that performs some operation associated with an industry such as mining, construction, farming, transportation, or any other industry known in the art.

The mobile machines 100 described herein can be operated manually, autonomously, or semi-autonomously. During conventional manual operation, an onboard operator controls and directs essentially all the functions and activities of the machine using the controls in the operator station described above. Remote operation may also occur remotely wherein the operator is located off board the mobile machine 100 and operation is controlled through a remote control transmitter and wireless communication techniques.

In autonomous operation, the mobile machine 100 can operate responsively to information about the operating and environmental conditions of the worksite 102 provided from various sensors by selecting and executing various determined responses to the received information. Autonomous mobile machines 100 include a computerized control system comprising hardware and software configured to make independent decisions based on programmed rules and logic. The control system uses sensor input about the machine environment, visions systems, etc., to control propulsion and steering in accordance with guidance controls, worksite or haul route information, and the assigned task or operations. In semi-autonomous operation, an operator either onboard or working remotely may control the machine to conduct some tasks and operations, while others are conducted automatically in response to information received from sensors. In all examples, positioning information to determine the location and/or positon of the machine is necessary.

In any of the above examples, to assist in operation of the mobile machine 100, the mobile machines 100 can be operatively associated with an onboard electronic controller 140. The onboard electronic controller 140 can be a programmable computing device and can include one or more microprocessors 142 for executing software instructions and processing computer readable data. Examples of suitable microprocessors include programmable logic devices such as field programmable gate arrays ("FPGA"), dedicated or customized logic devices such as application specific integrated circuits ("ASIC"), gate arrays, a complex programmable logic device, or any other suitable type of circuitry or microchip.

To store application software and data, the onboard electronic controller 140 can include a non-transitory computer readable and/or writeable data memory 144 or similar data storage that can be embodied, for example, as read only memory ("ROM"), random access memory ("RAM"), EPROM memory, flash memory, or etc. Data memory 144 can also be operatively associated with and utilize more permanent forms of secondary data storage such as magnetic hard drives. The data memory 144 is capable of storing software in the form of computer executable programs including instructions, definitions, and electronic data for the operation of the mobile machine. The programs can include equations, algorithms, charts, maps, lookup tables, databases, and the like.

To interface and network with the other components and operational systems on the mobile machine 100, the onboard electronic controller 140 can include an input/output interface 146 to electronically send and receive non-transitory data and information. The input/output interface 146 can be physically embodied as data ports, serial ports, parallel ports, USB ports, jacks, and the like to communicate via conductive wires, cables, optical fibers, or other communicative components that may be part of a communication bus or otherwise networked. The input/output interface 146 can communicatively transmit data and information embodied as electronic signals or pulses through physical transmission media such as conductive wires or as optical pulses through fiber optics. Communication can also occur wirelessly through the transmission of radio frequency signals. Communication can occur via any suitable communication protocol for data communication including sending and receiving digital or analog signals synchronously, asynchronously, or elsewise.

To assist with the navigation and travel of the mobile machine 100 about the worksite 102, the onboard electronic controller 140 can be operatively associated with and functionally implement a perception-based localization and navigation system 150 that utilizes various object perception and detection technologies and related devices, which as described below may work in combination with other positioning/navigation systems. The perception-based localization and navigation system 150 obtains observable information about objects externally located in the surrounding environment of the physical worksite 102 and processes that information to determine the geographic position of the mobile machine 100. The perception-based localization and navigation system 150 can function by detecting various markers, obstacles, and/or objects whose location/positions are previously known, for example, from a survey map of such objects. The detected worksite features may include geographic objects like the excavation sites 104 and material piles 106, stationary and artificial objects like buildings and structures, and mobile objects such as other mobile machines. The perception-based localization and navigation system 150 may further combine the obtained environmental information with other operational data about the mobile machine 100 to responsively control and navigate operation of the mobile machine in accordance with a determined task. The geographic location, geographic position or orientation, speed, velocity, travel direction and travel distance are examples of parameters that may be used to assist in navigation of the mobile machine 100.

The perception-based localization and navigation system 150 can obtain and capture perceptible data about structures and objects about the worksite 102 that the onboard electronic controller 140 can process and appropriately respond to. The perception data can include information such as distances, ranges, dimensional sizes and shapes, features, orientations, etc. By sequentially or repetitively capturing perception data, the onboard electronic controller 140 can also discern motion and movement information including speed and direction of moving objects or physical changes to the terrain and topology of the worksite 102 over time.

To obtain and provide data and information about objects, conditions, and activities in the physical worksite 102, the perception-based localization and navigation system 150 can include object detection devices. An example of an object detection device can be a LIDAR sensor or LIDAR device 152. The LIDAR (light detection and ranging) device 152 includes a light source or emitter that projects a laser or light beam that impinges upon and is reflected by material objects. The reflected light can be captured by a detector associated with the LIDAR device 152 and the elapsed time between projection and return of the light, and other characteristics of the reflected light such as intensity, can be processed and analyzed for ascertaining visual and definitional information regarding the reflecting object or terrain such as distance, size, shape, etc.

The perception data captured by the LIDAR device 152 can be recorded as a point cloud comprised of a plurality of individual reflected points produced by rapid projections from the light source. The plurality of individual points of the point cloud are plotted in an array having defined coordinates for geometric location. The combined characteristics of the individual points, such as intensity, provide a visual image detailing the three dimensional shape and dimensions of the scanned objects and background. The perception data creating the point cloud can be stored and transmitted as a computer readable image data file that the onboard electronic controller 140 can process. The LIDAR device 152 can be communicatively connected to and networked with the input/output interface 146 to send the image data files to the onboard electronic controller 140.

The LIDAR device 152 can be mounted on the machine frame 114 of, for example, the haul machine 110 to establish visibility over the worksite 102. The LIDAR device 152 can be rotated with respect to the machine frame 114 to capture wider visual angles or sweeps during scanning. To increase the captured visual area, multiple LIDAR devices 152 can be mounted to the machine frame 114, for example, at the front and rear ends of the haul machines 110.

To serve as a target for the LIDAR device 152, a plurality of visually perceptible, physical markers 154 can be designated about the physical worksite 102. In an embodiment, the physical markers 154 can be artificial structures of a defined shape and size that can reflect the laser or light beam projected from the LIDAR device. For example, the physical markers 154 can be planar diamond shaped plates that provide a two dimensional (X-Y) area that provides a defined shape that is readily recognizable by the LIDAR device 152. The physical marker 154 can be made from sheet metal and can be sized and colored for reflectivity and to enhance visibility, for example, approximately 2 meters by 2 meters in size and brightly painted. The physical markers 154 may have other shapes and configurations to render them prominent and conspicuous about the worksite 102. The physical markers 154 can include visual characters such as text, caricatures, and geometric patterns to convey comprehensible information to observers about the worksite 102 and associated with the location of the physical marker.

To elevate the physical marker 154 above the terrain surface of the worksite 102 and enhance visibility, the planar panel can be mounted to a post that can be planted into the ground. The physical marker 154 can also be mounted to other natural or artificial objects such as trees, fences, equipment, etc., at the worksite 102 or, as indicated, the physical markers 154 may be associated with recognizable natural features and landmarks. In some embodiments, the physical markers 154 may be mounted to structural features like buildings, equipment, and the like. Physical markers 154 can also be painted onto structural features or natural landmarks. Physical markers 154 can be mounted via a bracket to a pole, to a stationary or movable platform, or to a structure that is fixed and stationary.

In some embodiments, the physical markers 154 may also be associated with natural landmarks and features that can be visually detected and are recognizable by the LIDAR device 152. For example, formations like hills, berms, and rock formations, which may be relatively fixed within the worksite 102, may have distinctive features that are detectable by the perception-based localization and navigation system 150 and can therefore function as a recognizable detection target.

Other types of objects can function as physical markers. For example, tires or artificial or natural structures may be detectable by the LIDAR device, smart camera or other detection can be placed about the physical worksite 102 and the perception-based localization and navigation system 150 may be configured to recognize those objects as physical markers 154.

The physical markers 154 can be spatially associated with features and landmarks about the worksite 102. For example, because the off-road travel routes 108 may be difficult to visually discern from the surrounding terrain, physical markers 154 can be placed along the sides of travel routes 108 and function as navigation guides or wayfinders for the traveling mobile machines 100. The physical markers 154 can also be used to spatially designate or demarcate activity sites such as the excavation site 104 or the material piles 106, and may include visual characteristics or symbols to convey comprehensible information about or associated with the worksite location.

In another embodiment, the perception device can be a smart camera 156 that is mounted to the mobile machine 100. A smart camera 156 can be a machine vision system that can capture visual perception data embodied as visual digital images from its field of view and can include data analysis and processing capabilities to extract contextual and relational information regarding the perception data. The smart camera 156 can be programmed to specifically search for, recognize and/or identify the physical marker 154, which maybe distinctly shaped and colored to enhance perceptibility. The smart camera 156 can include automated autofocus, pan, and zoom functions to improve operation. The smart camera 156 can capture individual stationary images or continuous video that may be stored as a computer readable and transmissible image data file. The smart camera 156 can also be mounted to the machine frame 114 of the haul machine 110 to establish a field of view over the worksite 102. The perception-based localization and navigation system 150 can use a combination of LIDAR devices 152 and smart cameras 156.

In another embodiment, the perception system can make use of a different technology, for example, acoustic or radio frequency waves like radar. Similar to LIDAR, radar uses the transmission and reflection of radio waves by an object to determine its location, distance, geometry, and orientation with respect to a receiver, which can be interpreted to visualize objects such as mobile machines 100 and the associated activities within the surrounding worksite 102. The physical marker 154 can be physically shaped and contoured, and can be made of a material that is highly reflective of radio and/or acoustic waves to enhance the sensor's ability to sense the marker.

To provide additional referential information, the perception-based localization and navigation system 150 can be operatively associated with a position/navigation system 160 that is configured to determine a current position of the mobile machine 100 at the worksite 102. The position/navigation system 160 can be realized as a global navigation satellite system (GNSS) or global positioning satellite (GPS) system. In the GNSS or GPS system, a plurality of manmade satellites 162 orbit about the earth at fixed or precise trajectories. Each satellite 162 includes a positioning transmitter 164 that transmits positioning signals encoding time and positioning information towards earth. By calculating, such as by triangulation, between the positioning signals received from different satellites, one can determine their instantaneous location on earth.

To receive the satellite transmissions, positioning receivers 166 are located on each of the plurality of mobile machines 100. The positioning receivers 166 are antennas sensitive to the positioning signals and convert those signals to electrical signals the onboard electronic controller 140 can process. The positioning receivers 166 are mounted for adequate reception on the mobile machines 100 such as near the top of the machine frame. In an embodiment, the positioning receivers 166 can include two spaced-apart receivers that enables the position/navigation system 160 to determine angular orientation of the mobile machine 100 at the worksite 102 in addition to geographic location.

The position/navigation system 160 may also be configured as a laser based system in which a plurality of laser transmitters are located about the worksite. The laser transmitters transmit laser light that can be sensed by optical sensors on the mobile machines 100. If the precise location of the laser transmitters is known, it can be appreciated that the actual position of the mobile machine within the physical worksite can be determined. Such determination can be conducted based upon, as examples, the Doppler effect of the laser light or time periods between laser incidents on the transmitter/receivers.

To provide additional information and data for use by the perception-based localization and navigation system 150, the mobile machine 100 can include one or more machine sensors 168 that are in data communication with the onboard electronic controller 140. The machine sensors 168 can be any device for detecting or measuring a physical condition or change therein and outputting data representative of that occurrence. The machine sensors 168 can work on any suitable operating principle for the assigned task, and may make mechanical, electrical, visual, and/or chemical measurements.

For example, the machine sensors 168 can be configured to measure odometer data indicating the travel speed or velocity of the mobile machine 100 propelling about the worksite 102. Travel speed can be measured directed from rotation or translation of the wheels or continuous tracks, or may be measured indirectly such as by reflected acoustic or audio waves transmitted between the mobile machines 100 and the immediate surroundings at the worksite 102. The odometer data can be combined with the positional data obtained from the position/navigation system 160 and with the current travel or steering direction to estimate the projected or future geographical positions of the mobile machine 100.

The machines sensors 168 can also be engine sensors associated with the power source or engine of the mobile machine 100, or transmission or other powertrain component, and can measure engine output in terms of torque or engine speed, combustion information, and other engine information. The machine sensors 168 can also be environmental sensors that measure environmental conditions in which the mobile machines 100 are operating, such as environmental temperature, weather conditions, visibility, etc. Other examples of machine sensors 168 can include hydraulic pressure sensors that can obtain load or operational information from hydraulic actuators, steering or direction sensors, etc.

To interface with the operator, the onboard electronic controller 140 can be associated with a human machine interface (HMI) 170 that can be located in the operator station 118 of, for example, the mobile hauling machines 110. The HMI 170 can include a visual display screen 172 to visually present information to a human operator regarding operation of the mobile machine 100. The visual display screen 172 can be a liquid crystal display ("LCD") capable of presenting numerical values, text descriptors, graphics, graphs, charts and the like regarding operation. The visual display screen 172 may have touch screen capabilities to receive input from a human operator. Furthermore, the HMI 170 can include other interface input devices such as dials, knobs, switches, keypads, keyboards, mice, printers, etc.

To communicate and coordinate with other mobile machines 100 at the worksite 102, a transceiver 174 can be mounted to each of the mobile machines at an accessible location. The transceiver 174 can be configured for wireless communications and can send and receive wireless data transmissions using any suitable communication protocol such as WiFi. The transceiver 174 can be operatively connected to the onboard electronic controller 140.

To coordinate operation among the plurality of mobile machines 100 at the worksite 102, the onboard electronic controller 140 of each navigation and control system on the mobile machines can, through the transceiver 174, communicate and cooperate with a central worksite server 180. The worksite server 180 is located offboard with respect to the mobile machines 100 and can be remotely located at a stationary facility or building structure 182 at the worksite 102 or elsewhere. The worksite server 180 can be maintained by the operator of the worksite 102 or can be contracted to an independent application service provider (ASP).

The worksite server 180 includes computer hardware and software that provides functionality and resources supporting the ongoing operations and activities at the worksite 102. The worksite server 180 can host software applications and programming and can provide supplemental processing capabilities that can be accessed and used by other computing systems at the worksite 102. The worksite server 180 can serve as a central network node for communications and can function as a central repository for collection of data. The worksite server 180 can control access to worksite data and computational resources utilized by other systems with which it is networked. The worksite server 180 can administer and manage assignments and tasks related to worksite activities and operations to the plurality of mobile machines 100 and other equipment. The worksite server 180 can also be configured and programmed to identify operational errors and faults and to resolve such problems and discrepancies. The worksite server 180 can function as the control center for the worksite 102.

The worksite server 180 can include one or more microprocessors for the execution of software applications and computer programs and the processing of digital data. To interface with worksite personnel, the worksite server 180 can include data entry terminals and peripherals such as display monitors and keyboards for the entry and presentation of data. Although the worksite server 180 is illustrated as a single standalone unit at a single location, the hardware and functionality may be distributed among different devices at multiple locations.

The worksite server 180 can include a data storage 184 that contains and maintains computer readable data about the operations and activities of the worksite 102 including the plurality of mobile machines 100. The data storage 184 can log and store data about the plurality of mobile machines 100 such as the identities, geographic locations, functional capabilities, and assigned tasks. The data storage 184 can maintain a data table or log about the mobile machines and an electronic worksite map which may be a computer generated virtual representation about the worksite including geographical or topographical features such as terrain conditions, elevations, conditions, structures, objects, landmarks, etc.

To communicate with the plurality of mobile machines 100 via the transceivers 174 mounted thereon, the worksite server 180 can be operatively associated with a telematics system 188. The telematics system 188 can broadcast and receive wireless communications through radio waves about the worksite over sufficient distances to cover the worksite. The telematics system 188 can use any suitable wireless protocol or standard such as Wi-Fi.

The worksite server 180 can be responsible for generating and maintaining an electronic worksite map 190 that can be a virtual, computer-readable representation of the worksite 102 that can be rendered on a visual display system. Embodied as a data file, the electronic worksite map 190 can be stored and communicated electronically between computer systems networked to and associated with the worksite server 180. The electronic worksite map 190 may be in two dimensions (X-Y) or three-dimensions (X-Y-Z) and can depict the geography and topology of the worksite 102. The electronic worksite map 190 can be referenced to a coordinate system such as a Cartesian or Euclidian reference system and can be produced at a reduced scale to represent distances and elevations of the worksite topology. The electronic worksite map 190 can incorporate and depict the various worksite features that characterize the worksite including, for example, the excavation site 104, material piles 106, and travel routes 108.

As the physical worksite 102 develops, the worksite features including the geography and topology characterizing the worksite can change. The electronic worksite map 190 can be dynamic and represent changes and modifications of the worksite features with respect to time. To make changes and updates, information may be communicated to the central worksite server 180 via the telematics system 188 from, for example, the mobile machines 100 operating at the worksite 102. The electronic nature of the electronic worksite map 190 enables dynamic and automatic updates of the worksite features.

In addition to the worksite features, the electronic worksite map 190 can also designate and track the location of the plurality of mobile machines 100 using electronic machine designations. The designations of the mobile machine 100 in the electronic worksite map 190 can include information about the corresponding machines including identification, operating capabilities, assigned tasks, etc. Because the central worksite server 180 is in electronic communication via the telematics system 188 with the plurality of mobile machines 100, the central worksite server 180 can receive updated and current location data from the mobile machines 100 moving about the worksite 102 as determined by the position/navigation system 160.

The electronic worksite map 190 can also designate the location and/or status of the physical markers 154 placed around the worksite 102. As part of the layout of the worksite 102, the physical markers 154 are placed by worksite personnel at predesignated locations and/or orientations that can be recorded and represented in the electronic worksite map 190 as assigned marker positions. The assigned marker positions can include information about the corresponding physical marker 154, such as its identification, meaning, or duration at its present location.

Figure 2:
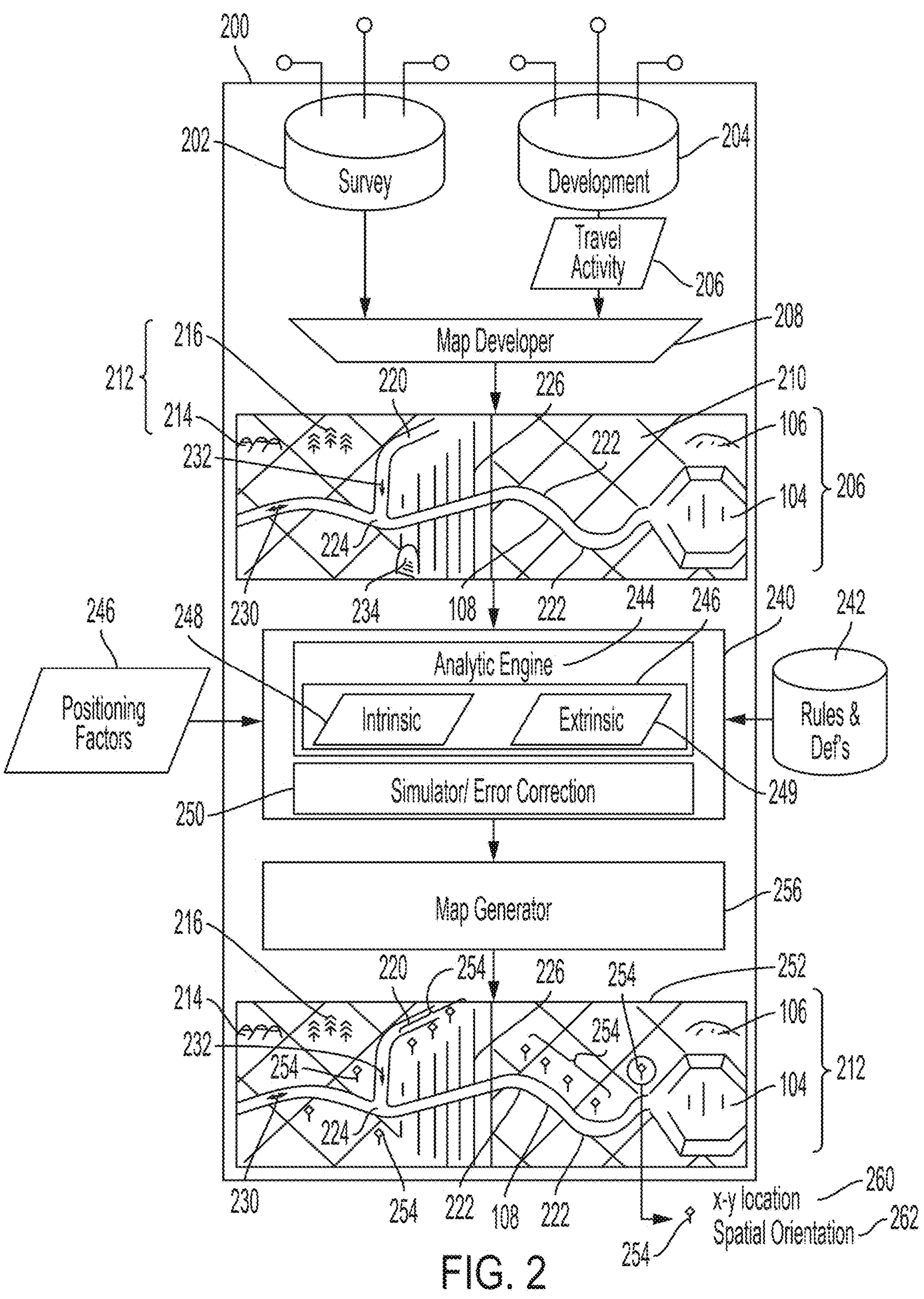
FIG. 2 is schematic block diagram of the components and features of a computerized worksite control system for the generation and utilization of an electronic worksite map implemented in accordance with the disclosure.

To generate and update the electronic worksite map 190, including determining appropriate geographic locations and spatial positions for the physical markers 154 about the worksite 102, the central worksite server 180 can be programmed with a map generation application 200 embodied as computer executable software code. Shown schematically in FIG. 2, the map generation application 200 can receive various data inputs and conduct processing functions and operations on that data to generate the electronic worksite map. The map generation application 200 can be comprised of software routines and modules that organize and arrange the processing functions and operations in an executable sequence. The routines and modules may be callable components of the map generation application 200 that can be separately invoked when appropriate. The routines and modules can be configured to interface and exchange data with other systems and programs, for example, by defining data types and data structures, and can include implementation functionality to process the exchanged data.

For example, the electronic worksite map can be based upon and represent survey data 202 that is obtained about the physical worksite 102. The survey data 202 can include information about the geography and terrain of the physical worksite 102 including locations, positions, elevations and other spatial or dimensional data about geometric landmarks at the physical worksite 102. The survey data 202 can be obtained by worksite personnel using conventional surveying techniques and equipment to measure distances, dimensions, and orientations of the different worksite features for representation in the electronic worksite map. As the worksite 102 develops and the topography changes, the survey data 202 can be updated. The survey data 202 can be input and stored as computer readable and executable information using the data entry terminals of the worksite server 180 and stored in the data storage 184.

The electronic worksite map can also include and reflect worksite development data 204 about the physical worksite 102. Worksite development data 204 can be data and information about intended or ongoing developments or activities that may establish or change the characteristics of the worksite 102. As a particular example, worksite development data 204 can identify travel/activity areas 206 that may include the excavation sites 104, the material piles 106, and/or the haul route 108, which are areas where mobile machine 100 will be traveling and/or operating. Worksite development data 204 can include the geographic or spatial representations of the activities and changes that are intended to be made and applied to the physical worksite 102.

The worksite development data 204 can include information about the geographic locations, outlines or perimeters, and dimension or surface area associated with the travel/activity areas 206. Development data 204 can be input by worksite personnel tasked with planning and arranging the development of the physical worksite 102. In an embodiment, the worksite development data 204 can be grouped and entered en masse as a model for the worksite 102, or can be entered and modified incrementally during planning of the worksite. The worksite development data 204 can also be dynamic and can change or be updated.

The map generation application 200 can include a map developer routine/module 208 that collects and processes the survey data 202 and the worksite development data 204 to create an initial unmarked worksite development map 210. The map developer routine/module 208 can prepare a computer-readable representation of the topology or terrain of the physical worksite 102 collected from the survey data 202 and apply to the representation the worksite development data 204 reflecting the developments, alterations, and activities intended for the worksite 102. The map developer routine/module 208 can designate particular areas for particular activities and operations including those corresponding to travel/activity areas 206, and can organize and arrange those areas within the worksite 102. The map developer routine/module 208 can be embodied as a modeling program operating with input from worksite personnel during the development planning for the physical worksite 102 and can include automated functionality to assist in the organization and integration of the survey data 202 and the worksite development data 204. The map developer routine/module 208 can allow for changes and alterations to the survey data 202 and/or worksite development data 204 to prepare different variations of the unmarked worksite development map 210 to facilitate planning of the worksite 102.

The initial unmarked worksite development map 210 can be embodied as a computer readable digital data file or image file that includes the data and instructions necessary for reproducing a two-dimensional or three-dimensional visual rendering of the physical worksite 102 on an appropriate visual display such as the visual display screen 172 on the HMI 170. The data file associated with the initial unmarked development map 210 can be electronically transferrable and can be communicated by any suitable electronic data transfer protocol.

The initial unmarked worksite development map 210 can include visual digital representations of the natural geographic and/or topology features that characterize the physical worksite 102 obtained by the survey data 202. Examples of these terrain or worksite features 212 can include natural or geographic features such as hills 214 or wooded areas 216, rock formations, berms, and other objects or elements existing within the physical worksite 102.

The unmarked worksite development map 210 can also include digital representations of the worksite development data 204, including the travel/activity areas 206, that are be developed within, conducted at, or applied to the physical worksite 102. The travel/activity areas 206 are associated with the assigned tasks and operations of the plurality of mobile machines 100 operating at the worksite 102. Examples of the travel/activity areas 206 may include operation sites like the excavation sites 104 being excavated by the excavators or the material piles 106 associated with loaders loading and/or dumping material. The travel/activity areas 206 included in the unmarked worksite development map 210 include the travel routes 108 for navigation of the mobile machines 100 about the worksite 102.

The travel/activity areas 206 incorporated into the unmarked worksite development map 210 can include specific contextual or physical details about travel routes 108, for example, whether a particular segment of the travel route 108 is a straight, linear route segment, or straightway 220, or is characterized by bends or route curves 222 causing directional changes in the travel route 108. Another example of the travel route segment detail that can be included in the initial unmarked worksite development map 210 can be a travel route segment that is associated with an intersection 224 where a plurality of traveling mobile machines 100 may converge. Another example of a specific travel route segment can be a change in incline, grade, or slope 226 of the travel route 108 cause by an elevation change in the topology of the physical worksite 102.

The initial travel/activity areas 206 may also include and communicate details about the anticipated or designated traffic conditions associated with various segments of the travel routes 108. For example, particular travel route segments may be designed for two-way traffic 230 in which oncoming mobile machines pass by each other and other travel route segments may be designated for one-way traffic 232. In another embodiment, the travel route segment may be an underground segment 234 characterized in that it is located in an underground mine or a similar location that limits access to a position/navigation system. Travel route segments can also be designed according to their surface condition, such as whether the travel route 108 is unpaved, paved, or otherwise maintained. Other information and details associated with the travel/activity area 206 including the travel routes 108 in the initial unmarked worksite development map 210 may include actual or anticipated traffic patterns or density, construction, etc.

The information and designations for the travel route segments, traffic patterns, etc., corresponding to the travel/activity areas 206 can be entered to the map developer routine/module 208 for incorporation into the worksite development map 210 by worksite personnel as development data 204.

To determine where to assign positions for the physical markers 154 in the worksite 102, the map generation application 200 can include a marker assignment routine/module 240 that can identify the travel/activity areas 206 with which to associate the physical markers. The marker assignment routine/module 240 can be embodied as a computer executable sub-process written in programming code.

Further, the marker assignment routine/module 240 can utilize predefined positioning rules and definitions 242 that are similar to an instruction set for the placement of the physical marker 154. The positioning rules and definitions 242 can be developed in accordance with convention and may be based upon standards and regulations. The positioning rules and definitions 242 may define, for example, the spatial distances between physical markers 154, the elevation or spatial orientation of physical markers 154, the geometry or visual appearance of the physical markers 154, and definitions and rules. The positioning rules and definitions 242 can be maintained in the form of a data library or lookup table.

To apply the positioning rules and definitions 242, the marker assignment routine/module 240 can include an analytic engine 244 that retrieves and analyzes one or more marker positioning factors 246 that influence and inform the placement and positioning of the physical markers. The marker positioning factors 246 can be used in cooperation with the positioning rules and definitions 242, or can modify the positioning rules and definitions 242 to adapt the assigned marker positions to the specific and possibly changing characteristics, environment, and operating conditions of the physical worksite 102. For example, the rules and definitions 242 may prescribe that a particular distance should be maintained between marker positions, 254 which may be modified based on the marker position factors 246.

The marker positioning factors 246 can be obtained from various sources, including the unmarked worksite development map 210, additional data and information about worksite conditions and activities, and from the perception-based localization and navigation systems 150 associated with the plurality of mobile machines 100. For example, the marker positioning factors 246 can be obtained from intrinsic sources such as information and data incorporated as part of the unmarked worksite development map 210. Intrinsic marker positioning factors 248 can be derived from survey data 202 and/or the worksite development data 204 that are included in and reflected by the worksite development map 210. The analytic engine 244 can identify the intrinsic marker positioning factors 248, for example, based on predefined definitions and classification, and can retrieve and apply the positioning rules and definitions 242 based on the intrinsic marker positioning factor 248 to develop assigned marker locations.

For example, the analytic engine 244 can associate or link the identified intrinsic marker positioning factor 248 with corresponding instructions in the positioning rules and definitions 242 that determine the geographic location and placement of physical markers 154 about the worksite 102. The analytic engine 244 may apply the positioning rules and definitions 242 in a deterministic manner in which there is a direct correlation or association between the positioning rules and definitions 242 and the intrinsic marker positioning factor 248. For example, the identification and classification of a travel/activity area 206 may consequentially determine which of the positioning rules and definitions 242 applies and deterministically assigns an assigned marker position to correspond with the identified travel/activity area.

In possible embodiments, the marker positioning factors 246 may be extrinsic in that they are independent of the unmarked survey map 210 and are entered independently, for example, through the data entry terminals associated with the worksite server 180. Extrinsic marker positioning factors 249 can be obtained by worksite personnel observing conditions or the environment associated with the physical worksite 102. Extrinsic marker positioning factors 249 can also represent desired or intended actions or development of worksite 102. As a further example, extrinsic marker positioning factors may be obtained from sources such as weather sensors about the worksite or machine sensors associated with the plurality of mobile machines.

By way of example as further described below, the marker positioning factors 246 including the intrinsic and/or extrinsic marker positioning factors 248, 249 can include or be associated with one or more of topography factors associated with the worksite features 212; traffic factors associated with the plurality of mobile machines 100 traveling about the physical worksite 102; a system resolution associated with the perception-based localization and navigation system 150; environmental factors associated with or occurring at the physical worksite 102; and operational factors associated with operation of the mobile machines 100.

The analytic engine 244 can be embodied as a distinct, callable software routine or module that receives and processes the unmarked worksite development map 210 via electronic communication from the map developer routine/module 208. The analytic engine 244 can be run in response to the receiving or identifying the marker positioning factors 246 to retrieve and apply the positioning rules and definitions 242 to produce the assigned marker positions. Alternatively, the analytic engine 244 can be operatively and functionally associated with the map developer routine/module 208 and automatically can apply the positioning rules and definitions 242 upon entry of the worksite development data 204 to produce the assigned marker positions.

In an embodiment, to assess and improve the effectiveness or accuracy of the assigned marker positions as determined by the analytic engine 244, the marker assignment routine/module 240 can include a simulator 250 or error checking subroutine. The simulator 250 can be a virtual computer model in which the assignments for the physical markers 154 are assessed against variable conditions including adjustment or changes to the marker positioning factors 246. The simulator 250 can model the detectability and performance of the physical marker 154 based on variations and alterations to the assigned marker position, which may be initiated automatically or by worksite personnel. The operations conducted by the simulator 250 can be repeated and adjustments or improvements can be made to the marker position assignments as described in further detail below.

To generate a marker worksite map 252 in electronic or computer readable format that includes visual digital representations of the assigned marker positions 254, the map generation application 200 can include a map generator 256. The assigned marker positions 254 can be associated with or represent the geographic locations intended for the corresponding physical marker 154 and the intended orientation or pose, e.g., elevation and direction, of the physical marker 154 within the physical worksite 102.

For example, the assigned marker position 254 can include the geographic location 260 in the marker worksite map 252 with respect to a latitude-longitude coordinate system. The assigned marker position 254 can also include the spatial orientation 262 including elevation and direction of the physical marker with respect to another feature or element in the worksite 102. For example, the spatial orientation 262 can state that the physical marker 154 should be angularly directed toward the haul route 108 to facilitate perceptibility toward oncoming traffic and the perception-based localization and navigation systems associated therewith.

In an embodiment, the map generator 256 can conduct an insertion operation in which the assigned marker positions 254 are embedded into the unmarked worksite development map 210. The generated marker worksite map 252 may therefore include the digital representations of the survey data 202 and the development data 204 from the unmarked worksite development map 210. In an embodiment, the map generator 256 can create the generated marker worksite map 252 from other sources to emphasize other relationships and elements.

Referring to FIG. 1, the worksite server 180 can communicatively broadcast the electronic worksite map 190 that corresponds to the generated marker worksite map via the telematics system 188 to the plurality of mobile machines 100 operating about the physical worksite 102. The onboard electronic controller 140 can use the information in the electronic worksite map 190, including the assigned marker positions 254 that correspond with the physical marker 154, in conjunction with the perception-based localization and navigation system 150 to navigate and guide the mobile machine 100 to travel and operate around the physical worksite 102. The electronic worksite map 190 can also be communicated to worksite personnel carrying display devices to assist in the placement and orientation of markers and in conducting other worksite activities.

INDUSTRIAL APPLICABILITY

Figure 3:
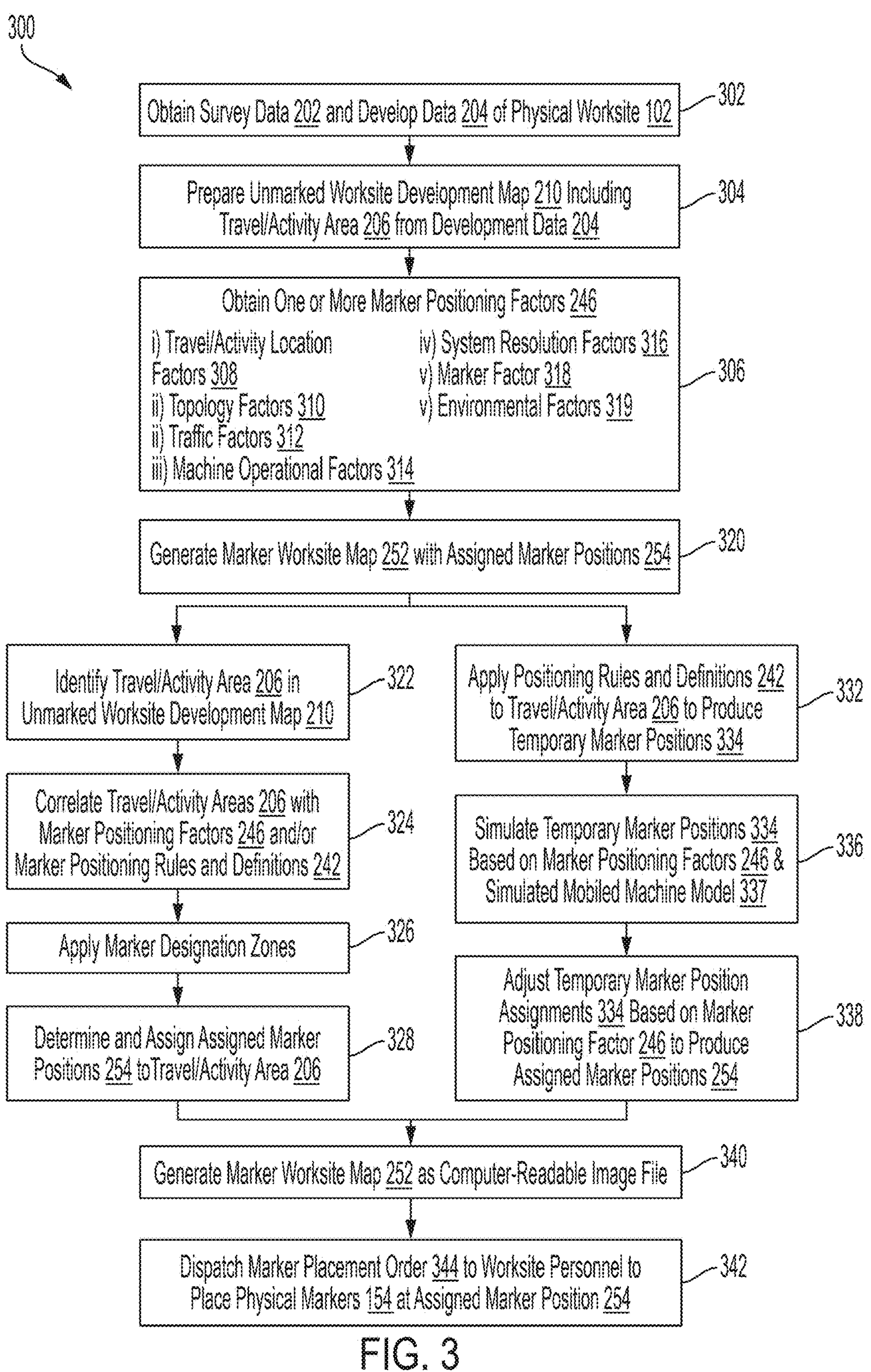
FIG. 3 is a flow diagram of the possible features and operations for generating, modifying, and/or updating the electronic worksite map in response to one or more marker positioning factors.

Referring to FIG. 3, with continued reference to the preceding figures, there is illustrated a flow diagram of possible events and actions that can be conducted by the map generation application 200 to generate a marker worksite map 252 in electronic or computer-readable format with the plurality of assigned marker positions 254. The described map generation process 300 or method can be implemented as non-transitory, computer-executable software programs written in any suitable programming language and run on any suitable computer architecture utilizing one or more processors and peripheral devices. For example, the central worksite server 180 can cooperatively interact with the other computer systems described herein, including the onboard electronic controllers 140 on the plurality of mobile machines 100, to generate and utilize the marker worksite map 252. In accordance with aspects of the disclosure, the plurality of mobile machines 100 can be operated autonomously, semi-autonomously, or manually at the worksite 102.

In a data-gathering step 302, the map generation application 200 can obtain survey data 202 about the physical worksite 102 and development data 204 intended for the physical worksite 102. The survey data 202 can be obtained by worksite personnel using conventional surveying equipment and techniques. The development data 204 may be the result of development planning for the worksite including tasks and activities to be undertaken to, for example, excavate material. The survey data 202 and development data 204 can be input to the computer implemented map generation process 300 by a data entry operation using the data entry terminals associated with the central worksite server 180.

In a map preparation step 304, the map developer routine/module 208 of the map generation application 200 can prepare the initial unmarked development map 210 from the survey data 202 and development data 204. The unmarked development map 210 can be embodied as an electronic or computer-readable data file to render a two-dimensional or three-dimensional visual representation of the physical worksite 102, including the travel/activity areas 206, and can be associated with or referenced to a two-dimensional or three-dimensional coordinate system. Worksite personnel can make modifications or adjust the worksite development map 210 to add travel/activity areas 206, exclusion zones or control zones to limit access, identify or verify worksite features, etc.

To determine and assign positions for the physical markers 154, the map generation application 200 can obtain the marker positioning factors 246 that may reflect specific conditions and/or activities associated with the physical worksite 102 and/or the travel/activity areas 206. Gathering the plurality of marker positioning factors 246 can be conducted during a factor gathering step 306 or operation. The factor gathering step 306 can obtain marker positioning factors 246 from intrinsic or extrinsic sources. For example, intrinsic marker positioning factors 246 can be obtained from analysis and identification of the intrinsic characteristics associated with the travel/activity areas 206. Extrinsic marker positioning factors 246 can be entered as data concerning extrinsic conditions associated with the physical worksite 102.

By way of example, the marker positioning factors 246 may include a travel/activity location factor 308 corresponding to the geometric location associated with the travel/activity area 206. For example, the travel/activity area 206 may be located where the perception-based localization and navigation system 150 is unnecessary, or may be located where it will be the primary operative system for a mobile machine 100. If a route segment of the travel route 108 is located in an underground mine, sunk within an excavation site 104, or in a hilly or wooded area, the mobile machine 100 may be unable to use the position/navigation system 160 to determine its position in the physical worksite 102. Accordingly, a sufficient number of physical markers 154 must be assigned to the travel/activity area 206 for operation of the perception-based localization and navigation 150. Correspondingly, if the travel/activity area 206 coincides with a location in which there is sufficient coverage by a position/navigation system 160, the mobile machines 100 may rely on the position/navigation system 160 and fewer markers for the perception-based localization and navigation system 150 are required or necessary. The generated marker worksite map 252 can indicate where coverage is provided by the position/navigation system 160 and where coverage relies primarily upon the perception-based localization and navigation system 150.

Another example of the marker positioning factors 246 may include topography factors 310 associated with the worksite features 212. For example, if the travel route 108 includes a travel route segment that corresponds with a curve 222 or a bend in route direction, a greater number or placement density of physical markers 154 may assist the perception-based localization and navigation system 150 onboard the mobile machine 100 in recognizing and comprehending the curve 222. Correspondingly, if the travel route segment is a linear, unvarying straightaway 220, the physical markers 154 can be spaced further apart at greater distances and with less frequency.

Topography factors 310 may also relate or be indicative of elevation of the worksite terrain. For example, if the travel route 108 incudes a travel route segment associated with an incline, grade or slope 226, advanced placement of the physical markers before or after the incline, grade, or slope 226 along the travel route 108, or continued placement of physical marker along the incline, grade or slope, may assist the perception-based localization and navigation system 150 in operating the mobile machine 100. Topography factors 310 can also indicate the presence and location of worksite features 212 like hills 214, wooded areas 216, berms, highwalls, mountains, etc., that could obstruct or hinder the perception of physical markers 154 by the perception-based localization and navigation system 150. Relatedly, the worksite features 212 may require specific spacing, distance, location and spatial orientation of the physical markers to appropriately demarcate the worksite features.

Another example of a marker positioning factor 246 can be traffic factors 312 associated with the plurality of mobile machines 100 traveling at the worksite 102. If the travel route segment corresponds with an intersection 224 or with two-way traffic 230, a greater number or more specific placement of the physical markers 154 can assist the perception-based localization and navigation system 150 with navigating the mobile machine 100 through denser traffic. Correspondingly, less trafficked or more remote travel route segments can be demarcated with fewer physical markers 154.

Another example of a marker positioning factor 246 can be operational factors 314 associated with the activities undertaken by the mobile machine 100. For example, if the mobile machine 100 is a haul machine 110 that travels at greater speeds over larger distances, the perception-based localization and navigation system 150 may require a regular placement of physical markers 154 along the travel routes 108 to assist travel. Correspondingly, if the mobile machine 100 is an excavator 130 that is relatively stationary and seldom travels, fewer or different placements of the physical markers 154 may assist the perception-based localization and navigation system 150.

Another example of a marker positioning factor 246 can be associated with the perception-based localization and navigation system 150. The perception devices such as the LIDAR device 152 or the smart camera 156 may have different resolutions by which they detect and perceive details. If the perception-based localization and navigation system 150 operates at a lower resolution, a greater number or larger geometric shape of the physical markers 154 may assist navigation of the mobile machines 100. Therefore, the marker positioning factor 246 can be a system resolution factor 316.

Another example of a marker positioning factor 246 can be a marker factor 318 that may be associated with the size, shape, or geometry of the physical marker 154. For example, larger physical markers 154 may be more easily perceived by the perception-based localization and navigation system 150, and therefore fewer markers may be needed with respect to the travel/activity area 206. As another example, the physical markers 154 may be unique and identifiable to a specific travel/activity area 206 based on informative indicia such as QR codes included thereon, color coding, etc. The marker factor 318 can indicate that a unique physical marker 154 should be associated with the travel/activity area 206.

Another example of marker positioning factors 246 can be environmental factors 319 associated with the physical worksite 102. For example, the worksite 102 may be associated with conditions that obscure visibility such as precipitation like rain, snow, fog, or may be dusty due to the unpaved travel routes 108. Other examples of marker positioning factors 246 may relate to surface conditions of the travel routes 108.

To assign positions for the physical markers 154, the marker assignment routine/module 240 of the map generation application 200 can retrieve the initial unmarked worksite development map 210 for processing with the obtained marker positioning factors 246. More particularly, the marker assignment routine/module 240 can execute a map generation step 320 that generates the marker worksite map 252 in electronic data format. In an embodiment, the map generation step 320 can be a straight forward operation including an identification sub-step 322 conducted by the marker assignment routine/module 240 that analyzes the unmarked worksite development map 210 and identifies the travel/activity areas 206 therein. In a correlation sub-step 324, the marker assignment routine/module 240 correlates the identified travel/activity areas 206 and the marker positioning factors 246, and may apply the positioning rules and definitions 242.

In a possible embodiment, the map generation step 320 can apply various restrictions or approvals based on or associated with spatial or geometric zones within the physical worksite 102. For example, spatial areas within the worksite 102 may not be suitable for placement of physical markers 154 for various reasons. The terrain immediately adjacent to the haul routes 108 may be unsuitable for physical markers 154 because of proximity to the traveling mobile machines 100, which could contact and strike the markers. Other spatial areas within the worksite 102 may experience or be associated with landsides or falling rocks, high wind conditions, etc., making them unsuitable for marker placement.

The zoning application sub-step 326 allows for the designation of marker designation zones. Examples of marker designation zones include marker restriction zones or marker prohibition zones that designate spatial areas, that may be identifiable in the unmarked worksite development map 210. Marker designation zones may also include marker approved zone where placement of physical markers 154 is acceptable. Information for applying and defining the marker designation zones can be included with the predefined marker positioning rules and definitions 242, for example, a rule establishing the terrain adjacently proximate to and extending along with the haul routes 108 as marker restricted zones to create a buffer. The zoning application sub-step 326 may also enable users to define or adjust marker exclusion zones, for example, which could be a type of an extrinsic marker positioning factor 249 input to the analytic engine 244.

In an assignment sub-step 328, the marker assignment routine/module 240 determines and assigns various assigned marker positions 254 with respect to the travel/activity areas 206 based on the marker positioning factors 246 and/or positioning rules and definitions 242. In some embodiments, stationary worksite features and objects may be designated and employed as assigned marker positions 254. The assigned marker positions 254 can include geographic locations 260 intended for the physical marker 154 and the intended spatial orientation 262 or pose, e.g., elevation and direction, of the physical marker 154 within the worksite 102.

In another embodiment, the map generation step 320 can be a more iterative process. For example, in an initial application and assignment sub-step 332, the marker assignment routine/module 240 can identify the different travel/activity areas 206 in the unmarked worksite development map 210 and can assign temporary marker positions 334 based on, for example, application of and in correlation with the positioning rules and definitions 242. The marker assignment routine/module 240 can execute a simulation sub-step 336 that can select and apply the marker positioning factors 246 to assess the effectiveness and accuracy of the temporary marker positions 334 during simulated navigation of the mobile machines 100. Effectiveness may be assessed based on the estimated ability of the perception-based localization and navigation system to perceive the temporary marker position 334 at a desired distance, viewing angle, or under various worksite and environmental conditions.

The simulation sub-step 336 can be a virtual computer model and the marker positioning factors 246 can be used as the variables and parameters to assess the effectiveness of the temporary marker positions 334. The marker positioning factors 246 may be adjusted and varied automatically or by worksite personnel. The simulation sub-step 336 can be repeated with different or adjusted marker positioning factors 246 for optimization, and the marker positioning factors 246 can be updated to reflect ongoing changes or developments in the physical worksite 102. In an adjustment sub-step 338 at the conclusion of the simulation sub-step 336, the marker assignment routine/module 240 can make iterative adjustments to the temporary marker positions 334 to produce the assigned marker positions 254 that better account for the marker positioning factors 246.

The simulation sub-step 336 can include a virtual or simulated version of a mobile machine equipped with a perception-based localization and navigation system 150 for testing of the temporary marker positions 334. The simulated mobile machine model 337 can be embodied as a computer file of programmed instructions and reactions that are responsive to the temporary marker positions 334. For example, operation of the virtual or simulated mobile machine model 337 can be observed and assessed in relation to and reacting to the temporary marker positions 334, and the adjustment sub-step 338 can make updates or changes to the temporary marker portions 334 based on the observed reactions. Effectiveness, for example, may be assess based on the accuracy of the temporary marker position 334 in determining the location of the simulated mobile machine model 337 in the simulated environment, or the reaction of the simulated mobile machine model 337 in accurately navigating the simulated environment.

Upon determining the assigned marker positions 254, the map generation step 320 can proceed to a generation sub-step 340 to create a generated marker worksite map 252 with the assigned marker positions 254 embedded therein. The marker worksite map 252 can be embodied as a computer-readable data file or image file that can be electronically communicated to various computer systems to render a visual image of the physical worksite 102 on a visual display such as the visual display screen 172 on the HMI 170. The marker worksite map 252 can combine the assigned marker position 254 with the visual information about the topology, terrain, and the travel/activity areas 206 from the initial worksite development map 210.

To communicate the information included in the marker worksite map 252, the described map generation process 300 can include a dispatch step 342 wherein the marker worksite map 252 is electronically transferred to interested parties and computer systems. For example, the dispatch step 342 can transfer marker placement orders 344 to worksite personnel to place physical markers 154 at the assigned marker positions 254 designated in the marker worksite map 252. The dispatch step 342 can also communicate the marker worksite map 252 to the onboard controllers 140 on the plurality of mobile machines 100 via the telematics system 188 for use by the perception-based localization and navigation system 150.

Figure 4:
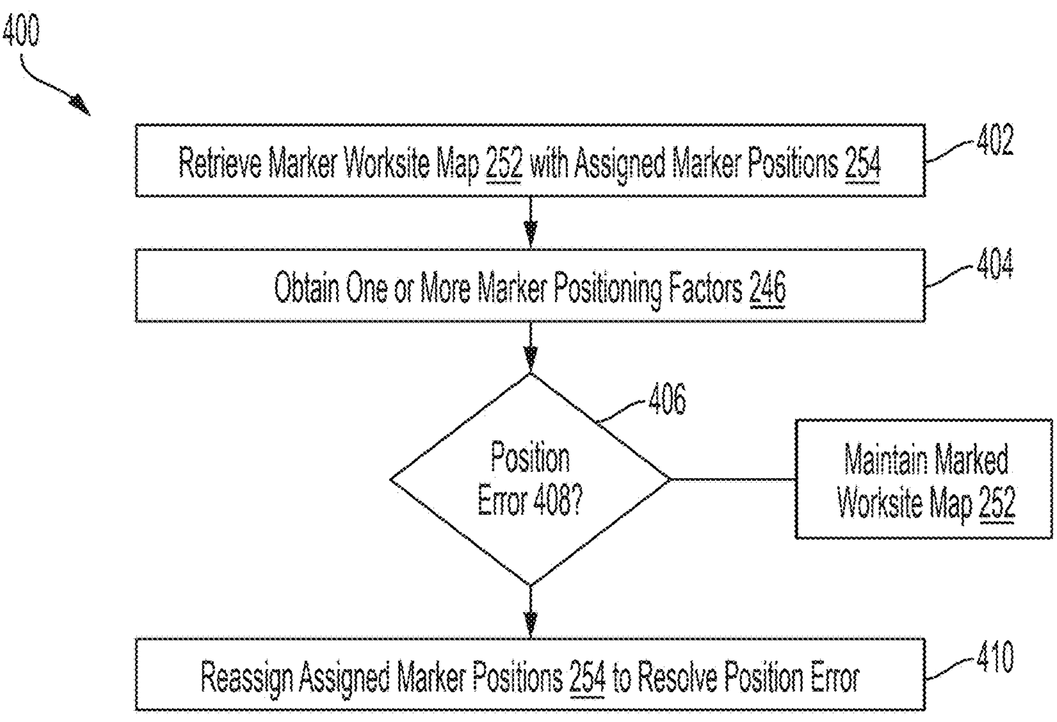
FIG. 4 is a flow diagram of the possible features and operations for detecting and resolving positioning errors with respect to the marker positions initially assigned in the electronic worksite map.

The map generation process 300 may also be associated with or call upon additional routines and modules to improve the usefulness of the electronic worksite map. For example, an error correction routine 400, as illustrated in FIG. 4, can be executed utilizing the functionality associated with the simulator 250 of the marker assignment routine/module 240 described above to detect and correct errors with the assigned marker positions 254. The error correction routine 400 may be similar to a virtual simulation model conducted on the marker worksite map 252 independently of the perception-based localization and navigation system 150.

In a retrieval step 402, the error correction routine 400 can retrieve the generated marker worksite map 252 with the assigned marker positions 254 in electronic format. In a factor gathering step 404, the marker positioning factors 246 can be obtained, for example, as intrinsic factors from the survey data 202 associated with the unmarked worksite development map 210, or as extrinsic factors entered through the central worksite server 180.

In an error detection decision 406, the error correction routine 400 can process the marker worksite map 252 with the marker positioning factors 246 to check and detect if there are possible position errors 408 with the assigned marker positions 254 in the marker worksite map 252. For example, if a particular travel route segment corresponds to a curve 222 or bend in the travel route 108, the error detection decision 406 can determine there is an insufficient number of assigned marker positions 254 to accurately guide the perception-based localization and navigation system 150 causing the mobile machine 100 to stop moving or possibly to travel off the designated travel route 108.

If the error detection decision 406 does not detect any position errors 408 with the assigned marker positions 254, the error correction routine 400 can maintain the marker worksite map 252 as is without correction. However, if the error detection decision 406 does detect position errors 408, the error correction routine 400 can include an error resolution step 410 that attempts to correct the position errors 408. For example, the error resolution step 410 can correct the position error 408 by reassigning the assigned marker positions 254 in the marker worksite map 252. This may include adjusting orientation, position, or pose associated with the assigned marker position 254. This may also include, for example, adding additional assigned marker positions 254 to increase the number and density of physical markers 154 demarcating the curve 222 or bend in the travel route 108 to improve the perceptibility of such to the perception-based localization and navigation system 150.

Figure 5:
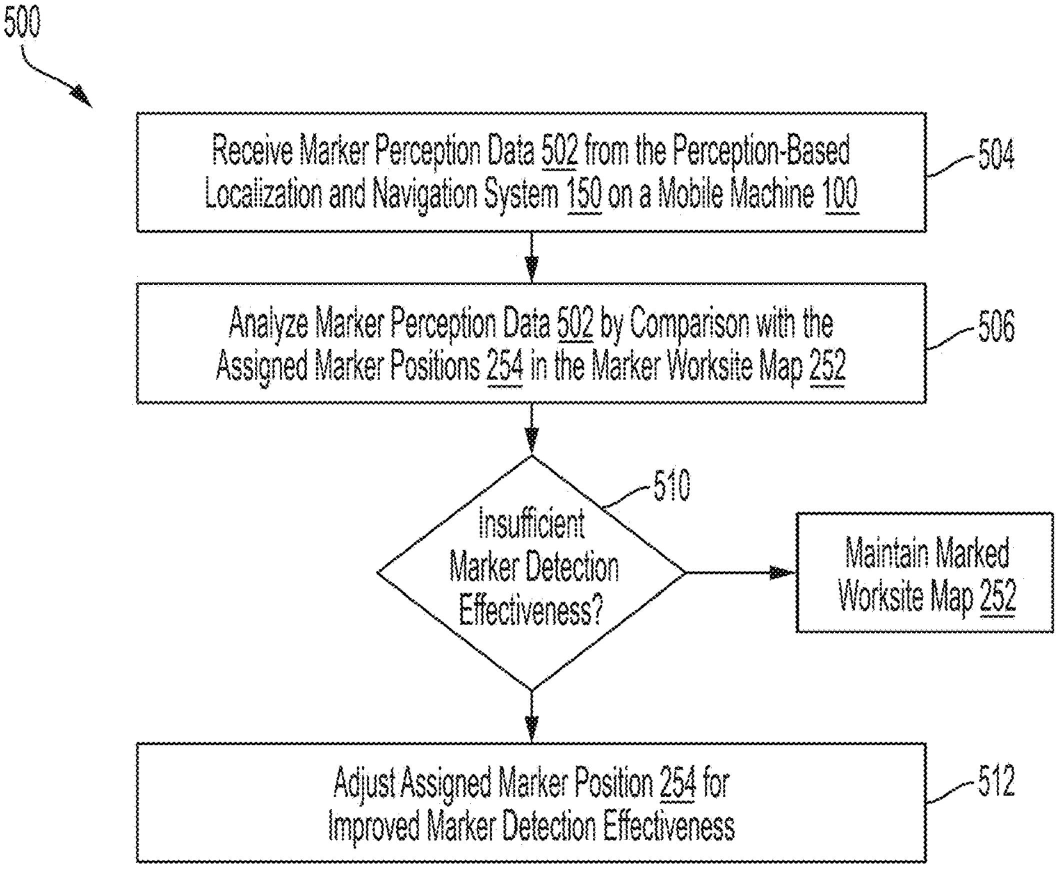
FIG. 5 is a flow diagram of the possible features and operations for detecting and resolving the detection effectiveness of the physical markers in accordance with the disclosure.

In another embodiment, a marker effectiveness routine 500, as illustrated in FIG. 5, can be executed to assess the effectiveness of the physical markers 154 in response to operation of the perception-based localization and navigation system 150. The marker effectiveness routine 500 can empirically analyze and test the perception-based localization and navigation system 150 and is related or connected with the perception-based localization and navigation system 150.

For example, the marker effectiveness routine 500 can receive marker perception data 502 in a data retrieval step 504 from the perception-based localization and navigation system 150 on a mobile machine 100 or a plurality of mobile machines 100. For example, the marker perception data 502 can be cumulative data gathered from a plurality of mobile machines 100 as they operate and conduct activities and tasks about the worksite 102. The marker perception data 502 can relate or represent the detection or the recognition of a physical marker 154 or a sequence or plurality of physical markers by the perception-based localization and navigation system 150. The marker perception data 502 can be communicated from the perception-based localization and navigation system 150 via the transceiver 174 on the mobile machine 100 to the telematics system 188 associated with the central worksite server 180.

In a data analysis step 506, the marker effectiveness routine 500 can analyze the marker perception data 502, for example, by comparison with the assigned marker positions 254 in the marker worksite map 252. The data analysis step 506 may determine if the perception-based localization and navigation system 150 is misidentifying the physical markers 154 or is encountering difficulty in identifying the physical markers 154 at the worksite 102. For example, the physical marker 154 may be insufficiently sized or positioned for the conditions of the worksite 102 and the marker positioning factors 246. The data analysis step 506 may also determine if the physical marker 154 is visually obscured by brushes or similar elements.

In another example, the data analysis step 506 can analyze the placement and locations of the physical markers 154, as indicated by the marker perception data 502, with respect to accurately determining the location of the mobile machine 100 within the worksite 100. For example, the marker perception data 502 can indicate the occurrence, frequency, and/or regularity at which the perception-based localization and navigation system 150 detects the physical markers 154. The frequency with which the perception-based localization and navigation system 150 detects the physical markers directly corresponds to the accuracy with which the perception-based localization and navigation system 150 can determine and pinpoint the location of the mobile machine 100 within the worksite 102. As the instances in which the physical markers 154 are detected increases or decreases, the accuracy with which the perception-based localization and navigation system 150 resolves the location of the mobile machine 100 correspondingly increases or decreases.

In an effectiveness decision 510, the marker effectiveness routine 500 can assess the effectiveness of one or more physical markers 154 based on its perceptibility with respect to the perception-based localization and navigation system 150. For example, the effectiveness decision 510 can determine the sufficiency with which the marker perception data 502 enables determining the location of the mobile machine, which may correspond to the frequency or occurrence of detecting the physical markers 154. Frequency of marker detections may be assessed based on operating time of a mobile machine, travel distance of a mobile machine, and other parameters. Increased intervals in terms of travel time or distance between marker detections corresponds with increase variability and inversely decreased accuracy in determining the geographic position by the perception-based localization and navigation system 150. The effectiveness decision 510 can be based on a threshold or range of sufficiency of the one or more physical markers 154 in being perceived. The threshold or range of sufficiency may be adjustable. If the effectiveness decision 510 determines the physical markers 154 are sufficiently perceptible based on the marker perception data 502, the marker effectiveness routine 500 can maintain the marker worksite map 252 as is without adjustment.

If the effectiveness decision 510 determines the physical markers 154 are insufficiently perceptible, the marker effectiveness routine 500 can include a perceptibility adjustment step 512 to improve the effectiveness of the physical markers 154. For example, the perceptibility adjustment step 512 can adjust the assigned marker positions 254 in the marker worksite map 252 for better or more effective positioning of the physical markers 154 in the worksite 102. As another example, if the frequency or rate at which physical markers 154 are detected is to infrequent, the perceptibility adjustment step 512 may increase the assigned marker positions 254 in the marker worksite map 252. The perceptibility adjustment step 512 can also direct replacement of one or more physical markers 154 at the worksite 102 to adjust the geometric shape or size, or the color or reflectivity of the physical marker, to improve perceptibility by the perception-based localization and navigation system 150.

In another embodiment, the effectiveness decision 510 can be used to update the marker worksite map 252 with indications as to the effectiveness of a particular assigned marker position 254. For examples, the assigned marker positions 254 may be color coded (green-yellow-red) in the marker worksite map 252 as to the perceptibility or the locational accuracy (e.g., shifting or sinking) of a physical marker 154 to the perception-based localization and navigation system 150. The perception-based localization and navigation system 150 can use the effectiveness decision 510 to determine or discount reliance on a particular physical marker 154.

Figure 6:
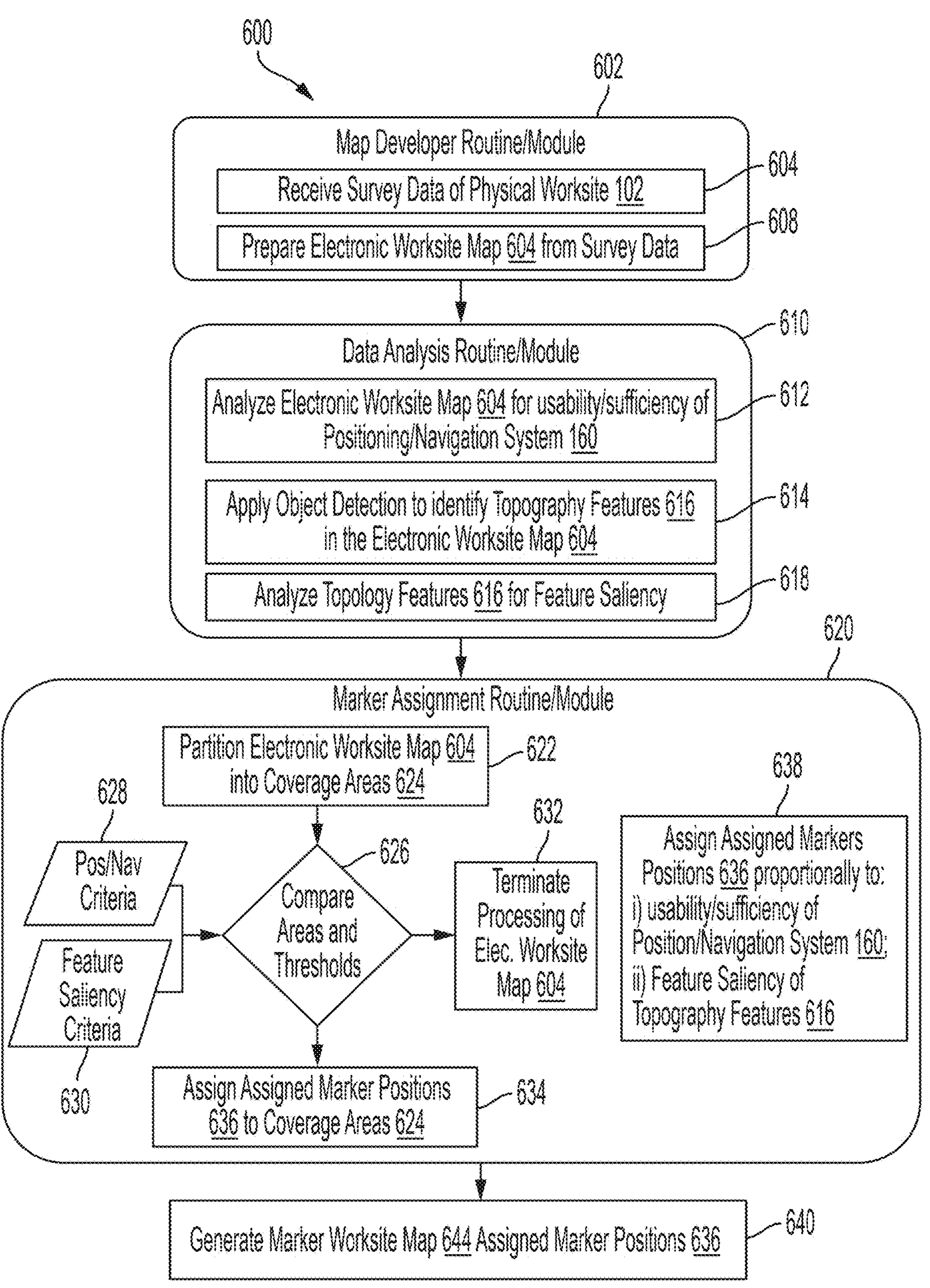
FIG. 6 is a flow diagram of another embodiment of a map generation program for generating a computer-readable worksite map that determines assigned marker positions in accordance with the usability/sufficiency of a position/navigation system and with feature saliency regarding a plurality of topography features.

Referring to FIG. 6, there is illustrated another embodiment of the map generation process 600 for generating a computer readable worksite map for use by mobile machines 100 equipped with perception-based localization and navigation systems 150. The map generation process 600 can be embodied as a computer executable program or application written in an suitable software programming language, and may be operatively and functionally integrated with the above-described programs and applications or may be configured as an independent callable routine or module. The map generation process 600 can be associated with and executed by the central worksite server 180 shown in FIG. 1 during the development of the electronic worksite map 190, although any suitable arrangement of computers and devices or equipment can be responsible for some or all of the functions, operations, and software associated with the map generation process 600, The map generation process 600 can include a map developer routine/module 602 to create an initial, unmarked electronic worksite map 604 of the physical worksite 102 that may be used for further analysis and processing. The unmarked electronic worksite map 604 can be a two-dimensional or three-dimensional computer-readable representation that may be visually rendered on a visible display screen and may include the geographical and topographical terrain, features, and characteristics of the physical worksite 102. To prepare the electronic worksite map 604, the map developer routine/module 602 can conduct a data collection step 606 in which worksite personnel can input survey data about the physical worksite 102 that can be obtained using traditional surveying techniques. The data collection step 606 can also receive, as data input, information about the developments and activities intended for the worksite 102, physical and functional relations between worksite features, spatial and dimensional information, etc. for preparing the electronic worksite map 604.

In a map preparation step 608, the map developer routine/module 602 can prepare the unmarked electronic map 604 as a computer-readable data file based on the survey data and other information received by the data collection step 606. Worksite personnel can modify, update, or adjust the unmarked electronic worksite map 604 as appropriate.

The map generation process 600 can include a data analysis routine/module 610 to further process and analyze the electronic worksite map 604 for assisting in the placement of physical markers 154 about the worksite 102. The data analysis routine/module 610 include functionality to identify, sort, categorize, and associated the relevant data and information included in the electronic worksite map 604 and/or gathered by and communicated from the data collection step 606 for making informed decisions.

For example, the data analysis routine/module 610 can include a system analysis step 612 to assess the applicability of a perception-based localization and navigation system 150 with respect to others systems such as a position/navigation system 160 that may be available at the worksite 102. The position/navigation system 160 may include or be embodied as a satellite navigation system utilizing data transmissions and signals from a plurality of manmade orbital satellites 162 for location and navigation purposes. If the worksite 102 is associated with a position/navigation system 160, placement of physical markers 154 for reliance and use by the perception-based localization and navigation system 150 may be unnecessary. The system analysis step 612 can determine and assess the applicability and sufficiency of a position/navigation system 160 with respect to geographic or topographic areas or regions in the electronic worksite map 604. The system analysis step 612 may determine or assess the availability and the relative effectiveness or accuracy of a position/navigation system 160 with respect to a perception-based localization and navigation system 150.

To further assess the suitability of the worksite 102 for use of a perception-based localization and navigation system 150, the data analysis routine/module 610 can also include an object detection step 614. The object detection step 614 can be conducted on the data and information associated with the electronic worksite map 604 to isolate and classify topography features 616 that are present at the worksite 102 and that may be suitable for use by the perception-based localization and navigation system 150. Examples of topography features 616 can include natural geographic landmarks, constructed geographic landmarks, and structural landmarks. Natural geographic landmarks include terrain topography such as hills, forest, plains, etc. Constructed geographic landmarks include material piles 106, excavation sites 104, travel routes 108, berms, high walls, etc. Structural landmarks may include buildings, equipment, and the like.

The object detection step 614 can use any suitable object detection model or algorithm to extract, recognize and classify the topography features 616. After the object detection step 614 identifies and extracts a plurality of topography features 616 from the data associated with the electronic worksite map 604, the data analysis step 610 can include a feature analysis step 618 to assess the feature saliency of the one or more topography features. Feature saliency refers to the prominence or conspicuousness of the topography feature 616 to be recognizable or detected by the detection devices, such as a LIDAR device 152 or smart camera 156, of the perception-based localization and navigation system 150. Feature saliency may further refer to the usefulness of the topography features 616 to the perception-based localization and navigation system 150 for localization and navigation purposes.

For example, the feature saliency of a topographic feature 616 can be qualitative and related to its appearance, including size, shape and/or color, which are visually recognizable. Feature saliency can also relate to physical or material characteristics or properties that may be detectable, for example, by acoustic, infrared, or similar techniques. Feature saliency can be assessed at different distances and spatial angles. Feature saliency may also be assessed by the number, quantity, and/or spatial relations between a plurality of topography features 616. For example, the larger the number of recognizable topography features 616 within a geographic area or region, the perception-based localization and navigation system 150 can more effectively and accurately determine location and position. Features saliency may be quantitative refer to the aggregate or totality of perceptible topology features 616 that enable a perception-based localization and navigation system 150 to determine location with a required or desired degree of accuracy and may correspond to or be associate with the quantity or number of topology features 616, The map generation process 600 includes an embodiment of the marker assignment routine/module 620 configured to informatively utilize the data obtained by the data analysis routine/module 610 in determining and assigning geographical locations for the physical markers 150 the worksite. In a possible embodiment, the marker assignment routine/module 620 may more particularly coordinate and assign the assigned marker positions 636 based on specific characteristics of the physical worksite in relation to the perception-based localization and navigation system 150. For example, in a map partition step 622, the marker assignment routine/module 620 can partition the electronic worksite map 604 into a plurality of smaller regions or areas referred to as coverage areas 624.

In an embodiment, the map partition step 622 can select the coverage areas 624 based on the data obtained or created by the data analysis routine/module 610. For example, the electronic worksite map 604 can be portioned and separated into the plurality of coverage areas 624 based on the usability of the position/navigation system 160 and on feature saliency of the one or more topography features 616. The map partition step 622 can therefore be an operation in which the marker assignment routine/module 620 filters the electronic worksite map 604 into distinct regions and applies corresponding boundaries or boarders based on the usability or sufficiency of the position/navigation system 160 and/or the feature saliency. The marker assignment routine/module 620 thereafter may accordingly select and designate the identified coverage areas 624 for the assignment of assigned marker positions.

In a further embodiment, the individual coverage areas 624 can each be associated with and reflective of the data and information processed and obtained by the data analysis routine/module 610 including, for example, the usability/sufficiency of the position/navigation system 160 and the feature saliency of the plurality of topography features 616. The individual coverage areas 624 thus may be indicative of the availability of satellite navigation with respect to corresponding region or area, or be reflective of the commonality of feature salience of the topography features 616 within the corresponding region or area. In an embodiment, data and information discovered or generated by the system analysis step 612 and the feature analysis step 614 can be informatively relied upon by the map partition step 622 to determine the boundaries and dimensional surface areas of the coverage area 624.

To determine the appropriateness of assigning marker positions to a coverage area 624, the marker assignment routine/module 620 can include a comparison step 626 that can apply and compare one or more predetermined criteria or thresholds. The criteria or thresholds are computer-readable data inputs that may be received from worksite personnel and can be adjusted or modified based on circumstances and desires outputs.

For example, a position/navigation criteria 628 can be indicative of the availability and coverage of a position/navigation system 160 with respect to the coverage area 624.

The position/navigation criteria 628 may reflect the accuracy with which the position/navigation system 160 can precisely determine location based on data signals transmitted from the satellites 162. The position/navigation criteria 628 can be selected to reflect the desired or required precision an accuracy in localization and navigation, for example, dependent upon traffic and terrain conditions, activities and operations of the mobile machines 100, etc.

In another example, the comparison step 626 can receive and apply a feature saliency criteria 630. The feature saliency criteria 630 can be a predetermined threshold or level with which the plurality of topology features 616 are effectively recognizable and perceptible to the perception-based localization and navigation system 150. The feature saliency criteria 630 can also be selected based upon extrinsic conditions such as traffic, activities and conditions of the mobile machines 100 and physical worksite 102, etc.

The comparison step 626 can compare the position/navigation criteria 628 and/or the feature saliency criteria 630 with relevant data and information associated with the coverage areas 624 to decide in assigning marker positions to the coverage areas. For example, if a particular coverage area 624 is associated with and sufficiency covered by a position/navigation system 160, as determined by the comparison step 626 utilizing the position/navigation criteria 628, the marker assignment routine/module 620 can proceed to a termination step 632 and dispense with further processing with respect to the coverage area 624. Similarly, if the feature saliency associated with a particular coverage area 624 is good, in the sense that a sufficient quantity of perceptible topography features 616 are present to enable accurate location by the perception-based localization and navigation system 150, the assignment routine/module 620 can proceed to a termination step 632.

If the comparison step 626, however, determines the coverage area 624 does not match or comply with the position/navigation criteria 628 and/or the feature saliency criteria 630, the marker assignment routine/module 620 can conclude that the coverage area 624 is appropriate for the use of the perception-based localization and navigation system 150. The marker assignment routine/module 620 can include an assignment step 634 to assign assigned marker positions 636 to the coverage area 624. As described above, the assigned marker positions 636 can include the geographical location and coordinates and the spatial orientation or pose of the physical marker 154.

In another embodiment, the marker assignment module/routine 620 can be configured to assign the assigned marker position 636 in a relative relation to the data and information discerned or generated by the data analysis routine/module 610. For example, in a proportional distribution step 638, the marker assignment module/routine 620 can allocate and distribute the locations of the assigned marker position 636 in a proportional relation to the applicability, usability, or sufficiency of a position/navigation system 160. In an embodiment, to simplify processing, the electronic worksite map 604 can be partitioned into the plurality of coverage areas 624 and the proportional distribution step 638 can be individually applied to each coverage area 624. In other embodiments, the proportional distribution step 638 can be applied over the entirety of the electronic worksite map 604 resulting in varying densities or concentrations of assigned marker positions 636.

In an example, the proportion distribution step 638 accommodates the ability of a mobile machine 100 to switch between a perception-based localization and navigation system 150 and a position/navigation system 160 based upon worksite circumstances. If the system analysis step 612 determines that the physical worksite 102 or areas therein are adequately or sufficiently covered by the position/navigation system 160, the proportional distribution step 638 may assign fewer assigned marker positions 636. Conversely, if the system analysis step 612 determines that position/navigation system 160 is insufficient for determining location with the required degree of accuracy, the proportional distribution step 638 can assign more assigned marker positions 636 or are higher density of assigned marker positions 636 for use by a perception-based localization system 150. The proportional distribution step 638 assigns a sufficient number of assigned marker positions 636 for the perception-based localization and navigation system 150 to reliably make accurate determinations in relation to the availability of other systems like the position/navigation system 160 The proportional rate may be adjustable.

Similarly, the proportion distribution step 638 can assign assigned marker position 636 in proportional relation to the feature saliency assessed by the feature analysis step 618. For example, if the feature saliency is low, indicating an absence or insufficiency of perceptible topography features 616 for the perception-based localization and navigation system 150 to function with the required accuracy, the proportional distribution step 638 may assign a greater number of assigned marker locations 636. That corresponds to a greater number of physical markers 150 being placed at the worksite 102 that are perceptible to the perception-based locational and navigation system 150 and reduces reliance on topography features 616. Conversely, if the worksite 102 or areas therein have a sufficient quantity of perceptible topography features 616, i.e. feature rich, the proportional distribution step 638 can reduce the number of assigned marker portions 636. In an embodiment, the proportional rate between feature saliency and corresponding quantity or number of assigned marker positions 636 may be adjustable.

The map generation process 600 can include a map generation step 640 to generate a marker worksite map 644 with the assigned marker positions 636 embedded therein. The marker worksite map 644 can be a computer-readable data file that may be communicatively transmitted to other systems, including the perception-based localization and navigation system 150 associated with the plurality of mobile machines 100. The map generation step 640 can be conducted by the map generator 256 in FIG. 2. In an embodiment, the map generation step 640 can insert the assigned marker positions 636 into the electronic worksite map 604 prepared by the map developer routine/module 602.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A worksite server comprising:

a map developer routine/module programmed to receive survey data about a physical worksite and prepare an unmarked worksite map in computer-readable format from the survey data;

a marker assignment routine/module including an analytic engine and a simulator, the analytic engine programmed to assign at least one assigned marker position to the unmarked worksite map and the simulator programmed to simulate an effectiveness of the at least one assigned marker position based on a perceptibility of a corresponding physical marker in the physical worksite; and a map generator to generate a marker worksite map in computer-readable format that includes the at least one assigned marker position.

2. The worksite server of claim 1, wherein the analytic engine receives and applies one or more marker positioning factors to assign the at least one assigned marker position.

3. The worksite server of claim 2, wherein the simulator adjusts the one or more marker positioning factors.

4. The worksite server of claim 3, wherein the one or more marker positioning factors includes one or more of a topology factor associated with the one or more worksite features, a traffic factor associated with the plurality of mobile machines, an environmental factor associated with the physical worksite, a system resolution factor associated with a perception-based localization and navigation system, and an operational factor associated with at least one of the plurality of mobile machines.

5. The worksite server of claim 4, wherein the worksite features are indicative of one or more of route curve, an intersection, an incline, and an elevation obstruction.

6. The worksite server of claim 1, wherein the simulator uses a simulated mobile machine model to simulate the effectiveness of the at least one assigned marker position.

7. The worksite server of claim 6, wherein the effectiveness of the at least one assigned marker position is based on a reaction of a perception-based localization and navigation system associated with the mobile machine model to the at least one assigned marker position.

8. The worksite server of claim 7, wherein the reaction of the perception-based localization and navigation system to the at least one assigned marker position is assessed based on distances and/or viewing angles between the mobile machine model and the assigned marker position.

9. The worksite server of claim 1, wherein the simulator is programmed to designate the at least one assigned marker position as a temporary marker position, to simulate the effectiveness of the temporary marker position, and to adjust the temporary marker position based on effectiveness.

10. The worksite server of claim 1, wherein the simulator is programmed to iteratively repeat simulating the effectiveness of the at least one assigned marker position.

11. A computer-implemented method of developing a computer-readable worksite map of a physical worksite comprising:

generating a worksite map including a plurality of assigned marker positions based in part on one or more marker positioning factors;

simulating an assigned marker position from the plurality of marker positions to assess an effectiveness of a perception-based localization and navigation system to perceive a physical marker in the physical worksite that corresponds to the assigned marker position; and adjusting the assigned marker position in the worksite map to improve perceptibility of the physical marker.

12. The method of claim 11, wherein the step of simulating the assigned marker position includes adjusting the one or more marker positioning factors.

13. The method of claim 12, wherein the step of simulating the assigned marker position uses a simulated mobile machine model responsive to the assigned marker position factors.

14. The method of claim 13, wherein the one or more marker positioning factors includes one or more of a topology factor associated with the one or more worksite features, a traffic factor associated with the plurality of mobile machines, an environmental factor associated with the physical worksite, a system resolution factor associated with the perception-based localization and navigation system, and an operational factor associated with at least one of the plurality of mobile machines.

15. The method of claim 11, further comprising iterating the step of simulating the assigned marker positions.

16. A computer-implemented method for updating a computer-readable worksite map of a physical worksite comprising:

retrieving a worksite map that includes one or more assigned marker positions;

obtaining marker perception data from a perception-based localization and navigation system associated with a mobile machine operating at the physical worksite;

analyzing the marker perception data to determine a perceptibility effectiveness of a physical marker in the physical worksite corresponding to an assigned marker position of the one or more assigned marker positions; and adjusting the assigned marker position in the worksite map to improve perceptibility effectiveness of the physical marker.

17. The method of claim 16, wherein the step of adjusting the assigned marker position in the worksite map includes assigning an effectiveness indication to the assigned marker position.

18. The method of claim 17, wherein the marker perception data is obtained from a plurality of mobile machines operating at the physical worksite.

19. The method of claim 16, wherein the marker perception data is indicative of a frequency with which the perception-based localization and navigation system detects physical markers at the physical worksite.

20. The method of claim 16, wherein the marker perception data is indicative of the accuracy of the perception-based localization and navigation system in locating a mobile machine at the physical worksite.

* * * * *